United States Patent
Kane et al.

(10) Patent No.: US 9,841,296 B2
(45) Date of Patent: Dec. 12, 2017

(54) ROTARY ARC POSITION SENSOR WITH LINEAR OUTPUT

(75) Inventors: Peter Kane, Rochester Hills, MI (US); John Lackey, Elkhart, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 26 days.

(21) Appl. No.: 13/696,220

(22) PCT Filed: Apr. 6, 2011

(86) PCT No.: PCT/US2011/031438
§ 371 (c)(1),
(2), (4) Date: Nov. 5, 2012

(87) PCT Pub. No.: WO2011/139469
PCT Pub. Date: Nov. 10, 2011

(65) Prior Publication Data
US 2013/0063134 A1 Mar. 14, 2013

Related U.S. Application Data

(60) Provisional application No. 61/331,577, filed on May 5, 2010.

(51) Int. Cl.
*G01B 7/30* (2006.01)
*G01B 7/14* (2006.01)
*G01D 5/14* (2006.01)

(52) U.S. Cl.
CPC .................... *G01D 5/145* (2013.01)

(58) Field of Classification Search
CPC ........ G01D 5/145; G01D 5/147; G01D 5/242; G01D 5/142; G01D 11/245; G01D 5/12;
(Continued)

(56) References Cited

U.S. PATENT DOCUMENTS 4,570,118 A 2/1986 Tomczak et al.
4,789,826 A 12/1988 Willett
(Continued)

FOREIGN PATENT DOCUMENTS

CN          1619255 A     5/2005
DE   102005051067 A1     5/2006
(Continued)

OTHER PUBLICATIONS

Machine Translation of WO 2010046550, Franchon et al., "Magnetic Position Sensor With Field Direction Measurement and Flux Collector", Apr. 29, 2010.*
(Continued)

*Primary Examiner* — Tung X Nguyen
*Assistant Examiner* — Lee Rodak

(57) ABSTRACT

A rotary position sensor includes a member with a shaft associated with the member such that movement of the member rotates the shaft. An arc-shaped permanent magnet is coupled to a periphery of the shaft for rotation therewith. First and second adjacent magnetic field concentrators define a gap there-between. Sensor structure is disposed in the gap. Upon movement of the member causing rotation of the shaft and magnet, the concentrators and sensor structure remain stationary, with the magnet providing a magnetic pole that changes the magnetic field in the gap. The sensor structure is constructed and arranged to respond to the changes in the magnetic field to identify a position of the member.

13 Claims, 3 Drawing Sheets

(58) Field of Classification Search
CPC ...... G01D 5/14; G01D 5/2033; G01D 5/2241; G01D 5/2497; G01D 5/2515; G01R 33/07; G01R 33/06; G01R 33/00; G01R 33/02; G01R 33/063; G01R 33/066; G01R 33/072; G01R 33/075; G01R 33/077; G01R 33/09; G01R 33/091; G01R 33/093; G01R 33/095; G01R 33/096; G01R 33/098; G01P 3/487
USPC ................................. 324/174, 207.11–207.26
See application file for complete search history.

(56) References Cited

U.S. PATENT DOCUMENTS

| | | | |
|---|---|---|---|
| 5,164,668 A | | 11/1992 | Alfors |
| 5,307,013 A | * | 4/1994 | Santos et al. ............... 324/207.2 |
| 6,130,535 A | * | 10/2000 | Herden et al. .............. 324/207.2 |
| 6,483,296 B1 | * | 11/2002 | Hamaoka et al. ........ 324/207.25 |
| 6,550,351 B1 | * | 4/2003 | O'Reilly et al. ................. 74/335 |
| 6,593,734 B1 | * | 7/2003 | Gandel et al. ........... 324/207.25 |
| 6,703,829 B2 | * | 3/2004 | Tola ....................... G01D 5/145 324/207.2 |
| 6,822,441 B1 | * | 11/2004 | Moreno ................. G01D 5/145 324/207.25 |
| 2002/0153879 A1 | * | 10/2002 | Muraji et al. ............... 324/207.2 |
| 2002/0179825 A1 | * | 12/2002 | Lin et al. .................. 250/231.14 |
| 2003/0227287 A1 | | 12/2003 | Hori |
| 2004/0100252 A1 | | 5/2004 | Babin |
| 2004/0196030 A1 | * | 10/2004 | Moreno ................. G01D 5/145 324/207.25 |
| 2007/0252591 A1 | * | 11/2007 | Babin .................... G01D 5/145 324/207.25 |
| 2008/0309324 A1 | * | 12/2008 | Stuve et al. ................ 324/207.2 |
| 2011/0115479 A1 | * | 5/2011 | Blakesley .............. G01D 5/145 324/207.25 |

FOREIGN PATENT DOCUMENTS

| | | |
|---|---|---|
| DE | 102006048771 A1 | 4/2008 |
| EP | 1467184 A2 | 10/2004 |
| EP | 1475525 A2 | 11/2004 |
| EP | 1745525 A2 | 11/2004 |
| WO | 2010046550 A1 | 4/2010 |
| WO | WO 2010046550 A1 * | 4/2010 |

OTHER PUBLICATIONS

Machine Translation of Frachon et al., DE 102005051067.*
PCT/US2001/031438, International Search Report and the Written Opinion of the International Searching Authority.

* cited by examiner

ROTARY ARC POSITION SENSOR WITH LINEAR OUTPUT

This application claims the benefit of the earlier filing date of U.S. Provisional Application No. 61/331,577, filed on May 5, 2010, which is hereby incorporated by reference into this specification.

FIELD

The invention relates to magnetic sensors and, more particularly, to rotary position sensors for vehicles.

BACKGROUND

A rotary position sensor is used in vehicle transmissions to determine what gear is engaged, e.g., park, reverse, neutral, drive and low (PRNDL). Information provided by the position sensor helps control some vehicle functions, such as lights, and can prevent vehicle start while in the wrong gear.

The dirty, vibrating, high temperature, fluid-filled chambers of a transmission make it a harsh environment, unsuitable for most types of angular position sensor technologies. Many existing rotary position (especially magnetic), sensors capable of this environment have large linearity error due to their rotating nature, which must be compensated for by electronics. In addition, the manufacturing and use of vehicles can often result in metallic debris. Many conventional magnetic position sensors collect this debris that must be cleaned off to operate effectively. Conventional rotary position sensors for this type of application also have less efficient magnetic circuits.

There is a need to provide a rotary position sensor that has a magnet with a reduced footprint so that it is less likely to attract debris, while having a magnetic circuit that is stronger and more efficient than conventional rotary position sensor magnetic circuits.

SUMMARY

An object of the invention is to fulfill the need referred to above. In accordance with the principles of the present invention, this objective is obtained by providing a rotary position sensor that includes a member with a shaft associated with the member such that movement of the member rotates the shaft. An arc-shaped permanent magnet is coupled to a periphery of the shaft for rotation therewith. First and second adjacent magnetic field concentrators are constructed and arranged to define a gap there-between. Sensor structure is disposed in the gap. Upon movement of the member, causing rotation of the shaft and magnet, the concentrators and sensor structure are constructed and arranged to remaining stationary, with the magnet providing a magnetic pole that changes the magnetic field in the gap. The sensor structure is constructed and arranged to respond to the changes in the magnetic field to identify a position of the member.

In accordance with another aspect of the invention, a magnetic circuit structure for a position sensor is provided. The circuit structure includes a rotatable shaft, an arc-shaped permanent magnet coupled to a periphery of the shaft for rotation therewith, first and second adjacent magnetic field concentrators are constructed and arranged to define a gap there-between, and sensor structure disposed in the gap. Upon rotation of the shaft and magnet, the concentrators and sensor structure are constructed and arranged to remaining stationary, with the magnet providing a magnetic pole that changes the magnetic field in the gap generally linearly. The sensor structure is constructed and arranged to respond to the changes in the magnetic field.

In accordance with yet another aspect of the invention, a method of sensing a position of a member provides a rotatable shaft associated with the member. An arc-shaped permanent magnet is provided on the shaft, the magnet defining a magnetic pole, defined at an outer radial surface of the magnet and pointing in a common direction across an entirety of the surface. Fixed sensor structure is also provided. The method ensures that upon movement of the member causing rotation of the shaft and magnet, the magnet changes the magnetic field concentrated at the sensor structure generally linearly, with the sensor structure being constructed and arranged to respond to the changes in the magnetic field to identify a position of the member.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
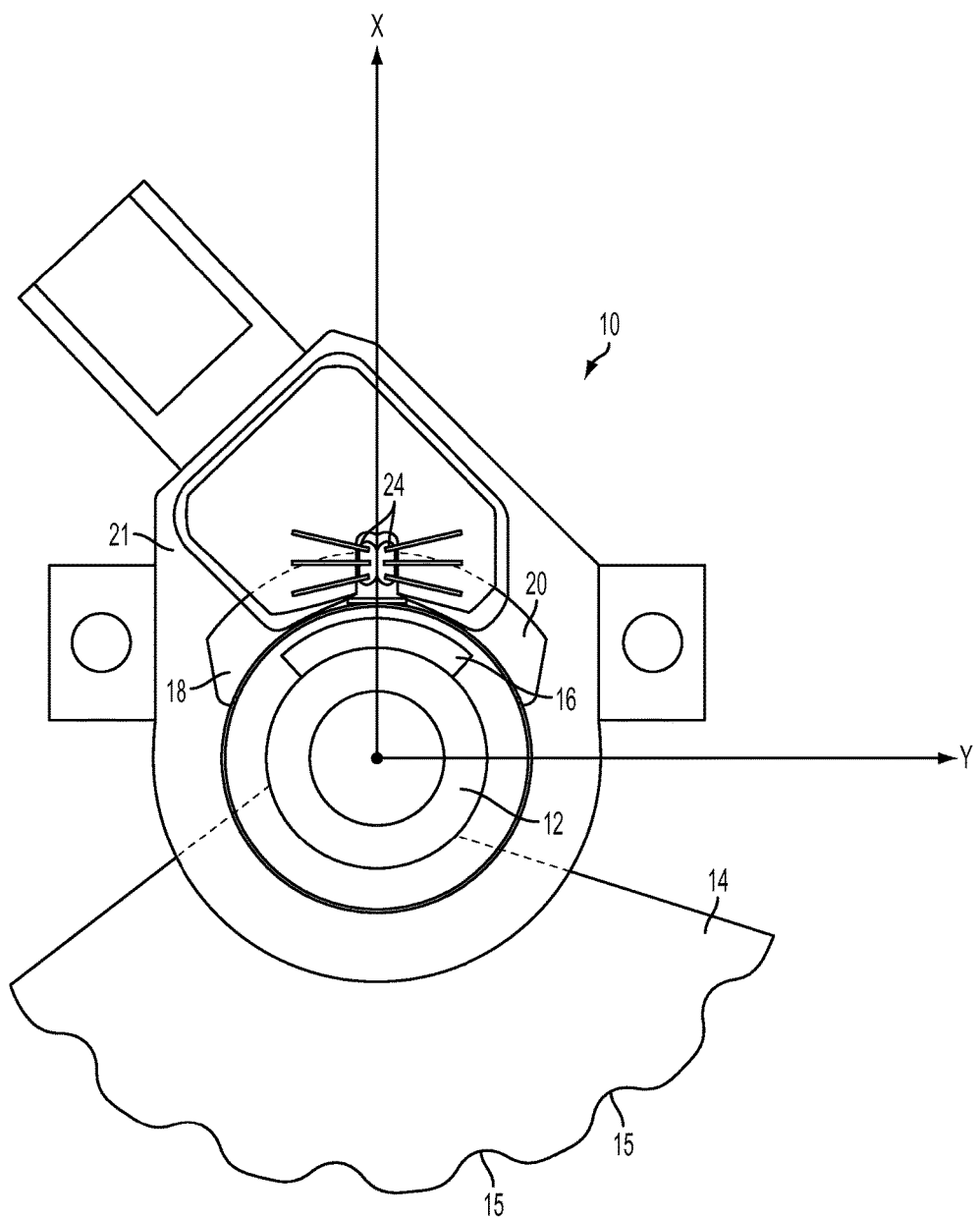
FIG. 1 is a top view of a rotary arc position sensor of an embodiment.

With reference to FIG. 1, a rotary arc position sensor is shown, generally indicated at 10, in accordance with an embodiment of the invention. The invention provides a position sensor to determine a position of any rotary element, such as a shaft. In the embodiment, the sensor 10 is for use in a vehicle automatic transmission to determine what gear is engaged, e.g., park, reverse, neutral, drive and low (PRNDL). The sensor 10 includes a rotatable shaft 12 that is associated with a détente plate 14. The détente plate 14 is formed with a plurality of detents 15 for latching the automatic transmission in a selected shift position (PRNDL), such as, in the manner disclosed in U.S. Pat. No. 6,658,960, the content of which is hereby incorporated by reference into this specification. Thus, movement of the détente plate 14 causes rotation of the shaft 12.

An arc-shaped permanent magnet 16 is fixed to the periphery of the shaft 12 so as to rotate therewith. The magnet 16 is preferably magnetized diametrically (not radially), since this lends the desired linearity to the output of the sensor 10, as explained more fully below. Using a radial-type magnetization may cause the output to appear as more of an S-shape instead of a straight transfer curve. This S-shape can be compensated for with expensive programmable magnetic field sensor, but a linear output can use less expensive components, and may be more desirable. Combining an expensive programmable sensor with this straighter curve may have a compounding effect in reducing linearity error.

Figure 2:
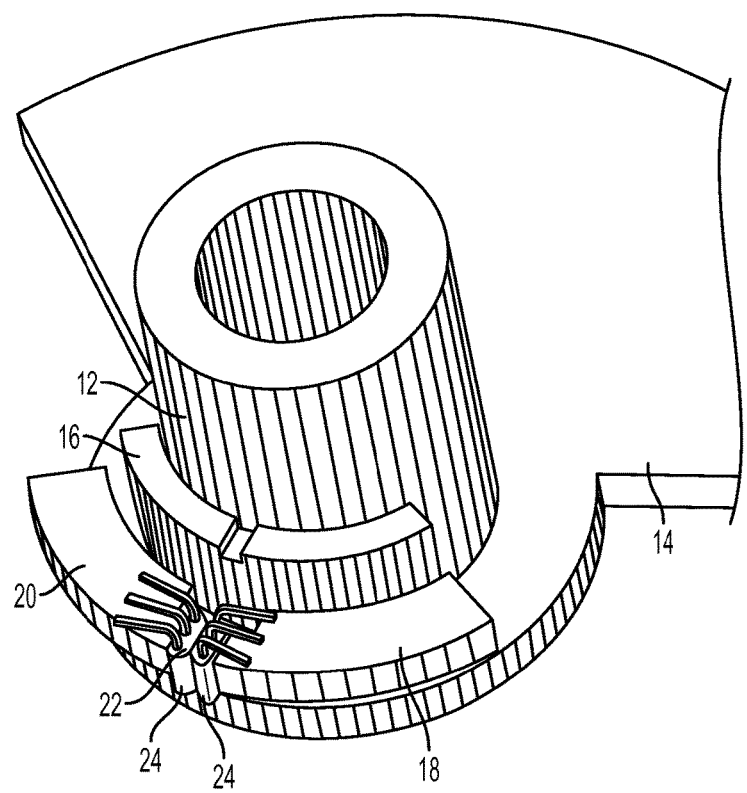
FIG. 2 is a perspective view of components of the sensor or FIG. 1 that define a magnetic circuit.

First and second magnetic field concentrators, 18 and 20 respectively, are provided in housing 21 generally adjacent to the magnet, but are not attached to the shaft and thus are in a stationary position with respect to the magnet 12. As best shown in FIG. 2, the generally arc-shaped concentrators are in spaced relation, defining a gap 22 there-between. The concentrators 18 and 20 are preferably of NiFe material (or a material with a similar B-H field) to avoid imparting hysteresis error on the sensor 10. Less robust materials may be used for the concentrators when employed in less demanding applications. The shape of the concentrators 18, 20 should be one that focuses the magnetic field on the sensor structure a certain distance from the magnet 16, and yet extends down to the magnet across both sides.

Figure 3:
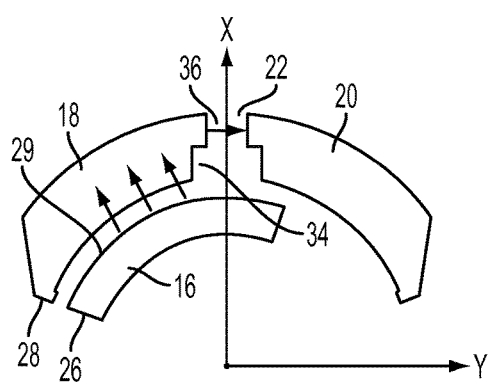
FIG. 3 is a schematic illustration of the magnet and concentrators of the magnetic circuit of FIG. 2, with the magnet shown in a first position.

The alignment of the magnet 18 and the concentrators 18, 20 is important for the linearity of the sensor 10. With reference to FIG. 3, upon rotation of the magnet 16, the left side outer edge 26 thereof should not extend significantly past the nearest outer edge 28 of the concentrator 18. Likewise, with reference to FIG. 4, upon rotation of the magnet in the opposite direction, the right side outer edge 30 thereof should not extend significantly past the nearest outer edge 32 of the concentrator 20. With reference to FIG. 5, a line A can be drawn from the edge 26 of the magnet to the edge of the lip on the concentrator 18, along the magnet's direction of magnetization. This line A is a good indicator of where non-linearity will significantly increase, should a configuration require a magnet extending beyond this location. Increasing the arc length of the concentrators 18, 20 along with the magnet 16 will prevent this increase in non-linearity. In the embodiment, ±25° of movement by the magnet 16 is captured by the ~45 degrees of concentrator arc length on either side (leaving a 5 degree gap 22 for sensor structure).

The sensor structure, for determining changes in a magnetic field, is provided in the gap 22 defined between the concentrators 18, 20. In the embodiment, the sensor structure comprises at least one conventional Hall effect sensor 24 that remains stationary with the concentrators 18, 20. A pair of Hall effect sensors 24 are shown in the gap 22 in a back-to-back arrangement. Each sensor 24 varies its output voltage in response to changes in the magnetic field in the gap 22. The magnetic field in the gap 22 changes upon rotation of the shaft 12 and thus the magnet 16. The sensors 24 are also used to help cancel ambient fields, non-linearity's, internal stresses, external AC field influences, or even temperature changes. As best shown in FIG. 3, the gap 22 includes a larger gap portion 34 and a smaller gap portion 36. The Hall effect sensors 24 are provided in the smaller gap portion 36. The larger gap portion 34 is generally adjacent to magnet 16 and forces the magnetic field primarily through the faces of the Hall effect sensors 24. Thus, a magnetic circuit structure of the sensor 10 is defined by the magnet 16, concentrators 18, 20, and sensor(s) 24.

The angle of desired measurement can be modified based on the arc length of the magnet, and the arc length of the concentrators. In the embodiment, each concentrator 18, 20 is of approximately 65° arc configuration and the magnet 16 is of approximately 90° arc configuration with the north pole perpendicular to the Hall effect sensor(s) 24. The arc length, height or diameter of the concentrators 18, 20 and/or magnet 16 can be selected, along with the materials used for the magnet 16, concentrators 18, 20, or shaft 12, for the desired application.

Figure 4:
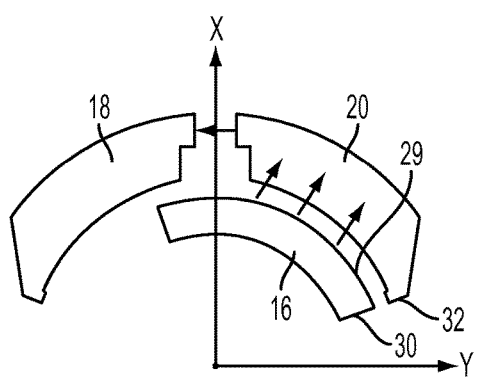
FIG. 4 is a schematic illustration of the magnet and concentrators of FIG. 3, shown with the magnet rotated to a second position.
Figure 5:
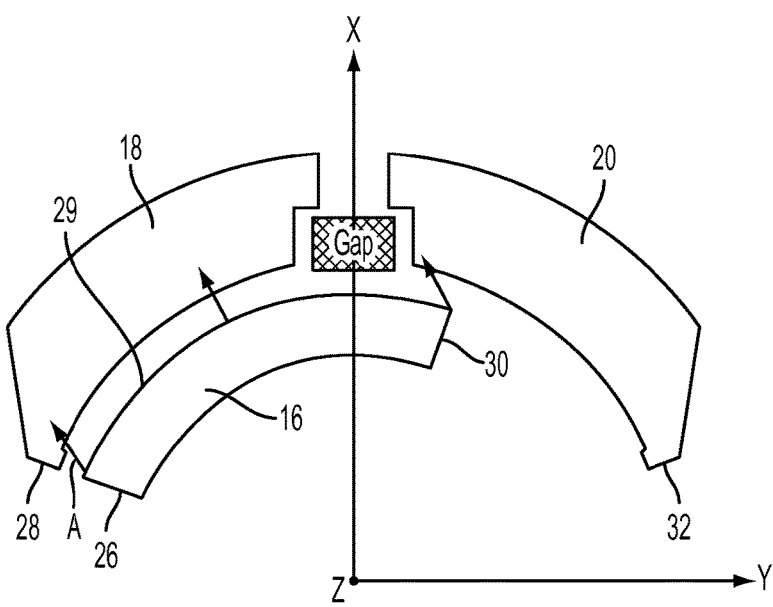
FIG. 5 is a schematic illustration of the magnet and concentrators of the magnetic circuit of FIG. 2, showing an edge relationship between the magnet and a concentrator.
Figure 6:
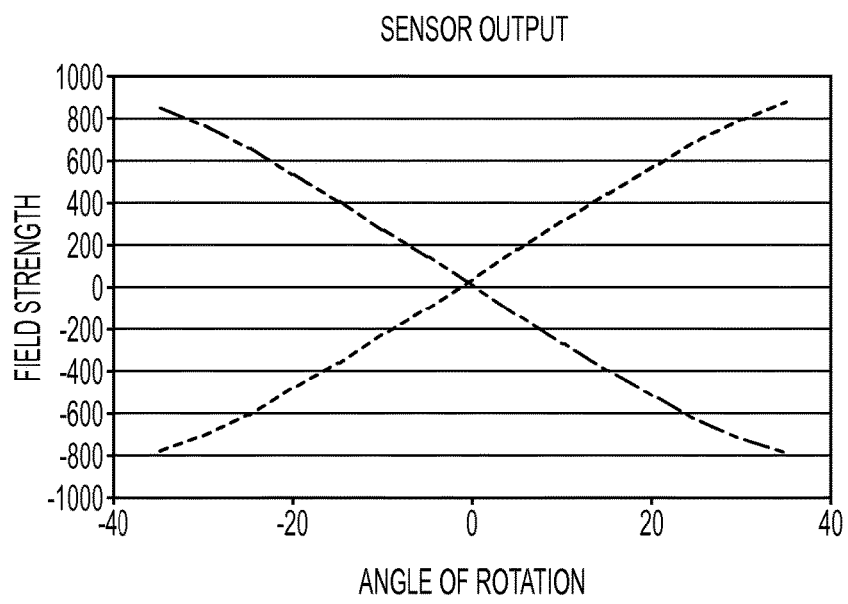
FIG. 6 is a graph of the position sensor output, e.g., angle of rotation (deg.) versus field strength (gauss).

As shown in FIGS. 3 and 4, the north pole at the outer radial surface 29 of the magnet 16 points in the same direction across the surface 29, despite the arc-shape of the magnet 16. With reference to FIG. 3, as the shaft 12 carrying magnet 16 rotates left to right (with the concentrators 18, 20 and sensors 24 remaining stationary), the magnetic field in the gap 22 shifts from positive to negative (changes direction). This is due to the north pole of the magnet 16 focusing more and more on the right concentrator 20, and less and less on the left concentrator 18. This causes an imbalance between the concentrators that is reflected at the gap 22 with the magnetic field in the gap 22 shifting from positive to negative. If the magnet 16 is rotated in the opposite direction (FIG. 4), the opposite happens (magnetic field in the gap 22 shifts from negative to positive) with the imbalance once again made up primarily in the gap 22 between the concentrators 18, 20, where the sensors 24 reside. Due to the geometry of the system, this transition, from positive to negative or from negative to positive, is linear (FIG. 6). In the embodiment, approximately ±800 gauss is provided at the Hall effect sensors 24 to ensure external field immunity.

Thus, the magnet 16 provides a magnetic pole that manipulates the observed field at the sensors 24 (push only configuration), instead of using simultaneous opposing poles (push-pull configuration) as in conventional position sensors. The concentrators 18, 20 guide that magnetic field through the field-sensor structure (e.g., sensors 24) perpendicular to the magnet 16.

By reducing the footprint of the magnet 16 (no ring-shaped magnet required) and isolating the magnet deeper inside the sensor housing, debris will be much less likely to cling to the housing during manufacturing. The sensor 10 reduces linearity error, increasing the linearity of output over a much larger degree of rotation. In addition, the magnetic circuit is scalable to the system being measured, is simplified in geometry, is stronger and more efficient than conventional magnetic circuits for such vehicle applications. The sensor 10 provides additional protection against external fields, reducing the potential error, especially in Hybrid Electric Vehicles where strong AC signals may be present. Lastly, the reduction in magnet size, concentrator size, and the removal of a shield (due to increased magnetic circuit efficiency and strength), provides significant cost savings.

Although the rotary arc position sensor 10 has been described relating to identifying one of a plurality of discrete positions of a transmission, it can be appreciated that the sensor 10 can function as absolute position sensor, identifying any position within the angle of motion.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A magnetic circuit structure for a position sensor, the circuit structure comprising:

a rotatable shaft having an outer periphery, a single arc-shaped permanent magnet coupled directly to the outer periphery of the shaft without being embedded in the shaft for rotation therewith, the magnet being magnetized diametrically, the magnetic pole being defined at an outer radial surface of the magnet, and points in a common direction across an entirety of the surface, a pair of adjacent magnetic field concentrators disposed to define a space between the magnet and the concentrators, each concentrator being of arc-shape and constructed and arranged to define a gap there-between, a concentrator arc length being defined as a total of an arc length of each concentrator plus a distance of the gap, the concentrators being constructed and arranged to be optimized with respect to the diametrically magnetized magnet, and sensor structure disposed in the gap, wherein the magnet has an arc length in degrees substantially less than the concentrator arc length in degrees, wherein upon rotation of the shaft and magnet, the concentrators and sensor structure are constructed and arranged to remain stationary, while the magnetic field shifts from positive to negative or from negative to positive in the gap by directing more of the magnetic field to one of the pair of magnetic field concentrators, and with the sensor structure being constructed and arranged to respond to changes in the magnetic field, and wherein the concentrators are constructed and arranged so that the gap includes a first portion extending in a radial direction that houses the sensor structure, without any portion of the concentrators being disposed in the first portion of the gap, and a second portion extending in the radial direction that is generally adjacent to the magnet so that a maximum width, in a direction transverse to the radial direction, of the second portion is in communication with the space without obstruction there-between, and is larger, in maximum width, in the direction transverse to the radial direction, than the first portion so as to force the magnetic field to the sensor structure.

2. The circuit structure of claim 1, wherein the sensor structure comprises at least one Hall effect sensor disposed perpendicular to the magnet.

3. The circuit structure of claim 2, wherein a pair of Hall effect sensors are provided in the gap in a back-to-back arrangement.

4. The circuit structure of claim 1, wherein the magnet has opposing outer edges defining an arc length of the magnet and the magnet is constructed and arranged such that upon rotation thereof in either of two directions, an outer edge of the magnet is generally adjacent to an outer edge, of an associated concentrator, which is distal from an edge defining a part of the gap.

5. The circuit structure of claim 1, wherein each concentrator has approximately a 65° arc configuration and the magnet has approximately a 90° arc configuration.

6. A rotary position sensor comprising:

a member, a shaft associated with the member such that movement of the member rotates the shaft, a single arc-shaped permanent magnet coupled directly to an outer periphery of the shaft without being embedded in the shaft for rotation therewith, the magnet being magnetized diametrically, the magnetic pole being defined at an outer radial surface of the magnet, and points in a common direction across an entirety of the surface, and wherein the magnet changes the magnetic field generally linearly, a pair of adjacent magnetic field concentrators disposed to define a space between the magnet and the concentrators, each concentrator being of arc-shape and constructed and arranged to define a gap there-between, a concentrator arc length being defined as a total of an arc length of each concentrator plus a distance of the gap, the concentrators being constructed and arranged to be optimized with respect to the diametrically magnetized magnet, and sensor structure disposed in the gap, wherein the magnet has an arc length in degrees substantially less than the concentrator arc length in degrees, wherein upon movement of the member causing rotation of the shaft and magnet, the concentrators and sensor structure remain stationary, while the magnetic field shifts from positive to negative or from negative to positive in the gap by directing more of the magnetic field to one of the pair of magnetic field concentrators, and with the sensor structure being constructed and arranged to respond to changes in the magnetic field to identify a position of the member, and wherein the concentrators are constructed and arranged so that the gap includes a first portion extending in a radial direction that houses the sensor structure, without any portion of the concentrators being disposed in the first portion of the gap, and a second portion extending in the radial direction that is generally adjacent to the magnet so that a maximum width, in a direction transverse to the radial direction, of the second portion is in communication with the space without obstruction there-between, and is larger, in maximum width, in the direction transverse to the radial direction, than the first portion so as to force the magnetic field to the sensor structure.

7. The sensor of claim 6, wherein the member is a détente plate having a plurality of detents defining shift positions, of an automatic transmission of a vehicle, as the positions.

8. The sensor of claim 6, wherein the sensor structure comprises at least one Hall effect sensor disposed perpendicular to the magnet.

9. The sensor of claim 8, wherein a pair of Hall effect sensors are provided in the gap in a back-to-back arrangement.

10. The sensor of claim 6, wherein the magnet has opposing outer edges defining an arc length of the magnet and the magnet is constructed and arranged such that upon rotation thereof in either of two directions, an outer edge of the magnet is generally adjacent to an outer edge, of an associated concentrator, which is distal from an edge defining a part of the gap.

11. The sensor of claim 6, wherein each concentrator has approximately a 65° arc configuration and the magnet has approximately a 90° arc configuration.

12. A method of sensing a position of a member, the method comprising:

providing a rotatable shaft associated with the member, providing a single arc shaped permanent magnet directly on an outer periphery of the shaft and without being embedded in the shaft, the magnet defining a magnetic pole, defined at an outer radial surface of the magnet, the magnet being magnetized diametrically, the magnetic pole being defined at an outer radial surface of the magnet, and points in a common direction across an entirety of the surface, providing a pair of adjacent magnetic field concentrators disposed to define a space between the magnet and the concentrators, each concentrator being of arc-shape and constructed and arranged to define a gap there-between, a concentrator arc length being defined as a total of an arc length of each concentrator plus a distance of the gap, the magnet having an arc length in degrees substantially less than the concentrator arc length in degrees, the concentrators being constructed and arranged to be optimized with respect to the diametrically magnetized magnet, providing fixed sensor structure associated with the gap, wherein the concentrators are constructed and arranged so that the gap includes a first portion extending in a radial direction that houses the sensor structure, without any portion of the concentrators being disposed in the first portion of the gap, and a second portion extending in the radial direction that is generally adjacent to the magnet so that a maximum width, in a direction transverse to the radial direction, of the second portion is in communication with the space without obstruction there-between, and is larger, in maximum width, in the direction transverse to the radial direction, than the first portion so as to force the magnetic field to the sensor structure, ensuring that upon movement of the member causing rotation of the shaft and magnet, the magnetic field shifts from positive to negative or from negative to positive at the sensor structure by directing more of the magnetic field to one of the pair of magnetic field concentrators, with the sensor structure being constructed and arranged to respond to changes in the magnetic field to identify a position of the member.

13. The method of claim 12, wherein the sensor structure is provided as at least one Hall effect sensor mounted in the first portion of the gap.

* * * * *